Aug. 19, 1924.
H. E. WARREN
AUTOMATIC REGULATION
Filed Dec. 12, 1921
1,505,925
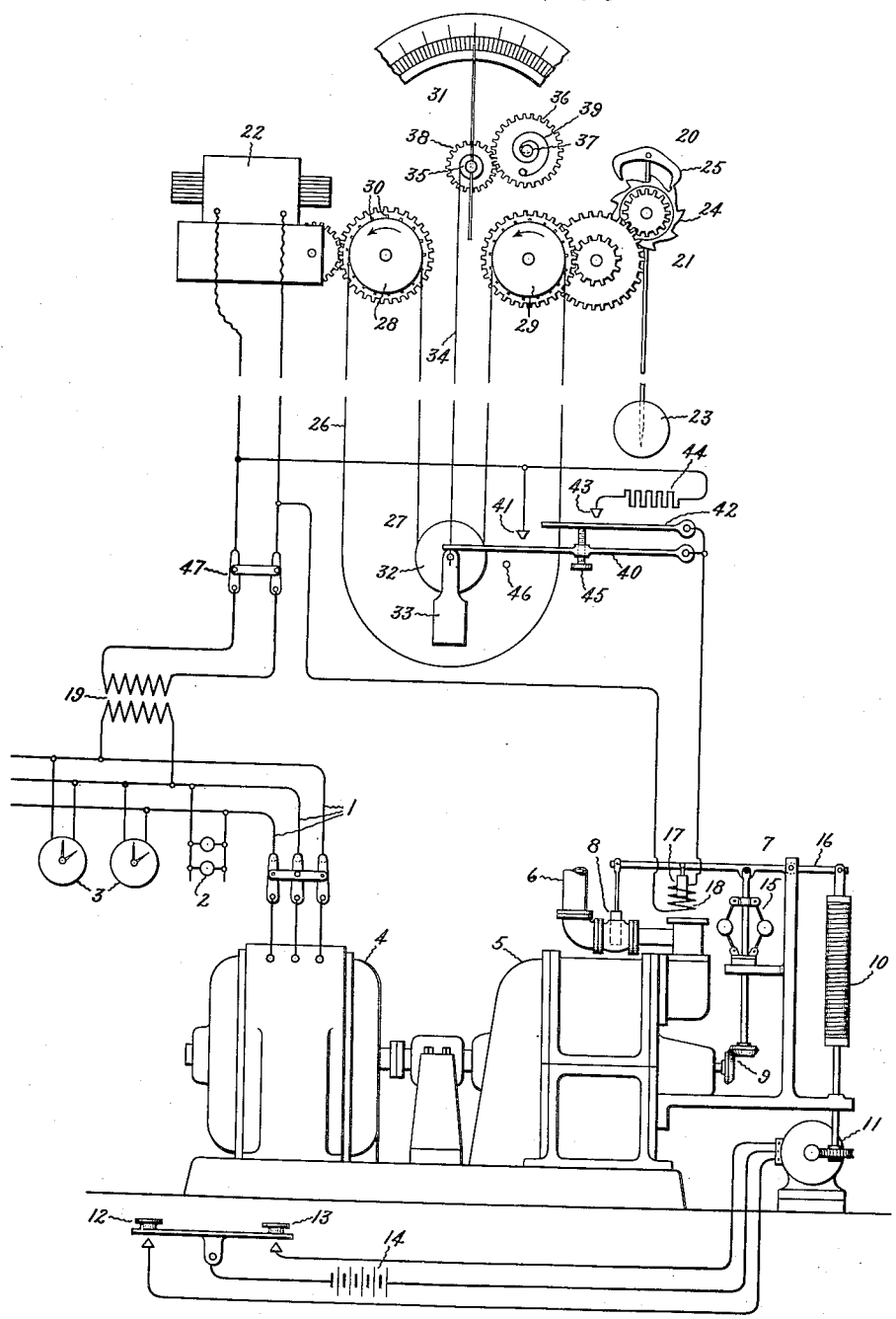
Inventor:
Henry E. Warren,
by Albert G. Davis
His Attorney.

Patented Aug. 19, 1924.

1,505,925

UNITED STATES PATENT OFFICE.

HENRY E. WARREN, OF ASHLAND, MASSACHUSETTS, ASSIGNOR TO WARREN CLOCK COMPANY, A CORPORATION OF MAINE.

AUTOMATIC REGULATION.

Application filed December 12, 1921. Serial No. 521,589.

*To all whom it may concern:*

Be it known that I, HENRY E. WARREN, a citizen of the United States, residing at Ashland, county of Middlesex, State of Massachusetts, have invented certain new and useful Improvements in Automatic Regulations, of which the following is a specification.

My invention relates to speed control systems and although not limited thereto my invention is particularly adapted to speed control systems for electric generating apparatus, such for example as those to which are connected, in addition to the ordinary commercial load, electrically operated secondary clocks.

In order that secondary clocks operated from a commercial source may indicate accurately, it is necessary to insure a constant rate of the indicating element. Where the rate of the secondary clocks is directly dependent upon the speed of rotating apparatus at the central station, it is evident that a speed control system must be used for maintaining the average speed of the rotating apparatus at an absolutely uniform value. In case synchronous motor-driven secondary clocks are operated from a commercial alternating current system, it is necessary that the average frequency be maintained at a constant value so that the secondary clocks connected on the system may always indicate accurately, since the speed of the motors is absolutely proportional to the frequency. In many instances it is highly desirable that the normal regulation of the system be automatic so that no manual adjustments of speed need be made.

In addition to the need for speed regulation, it is also necessary to take care of temporary interruptions in the service so that the secondary clocks may be brought back into coincidence with an accurately adjusted timepiece. This is especially important since it is impossible to safeguard totally against these temporary interruptions. These are for the most part of short duration, although it may happen very infrequently that the interruptions extend for as long a period as two hours. It is extremely desirable, whether the interruptions be short or long, to arrange matters in such a way that upon the resumption of the service the secondary clocks may be speeded up by means of an increase in the speed of the rotating apparatus while the secondary clocks are slow, that is, while their indications are behind that of a standard timepiece. This increase above normal rate of the secondary clock should normally be effected by automatic means, thus obviating manual manipulation by the station attendants. Such controlling means as I have outlined above is especially useful where the secondary clocks are driven by self-starting synchronous motors, or by other self-starting mechanisms, such as direct current electromagnets, for then it is absolutely certain that each and all of the secondary clocks will stop and start operating at the same instant; but any clock system may embody this feature of my invention, provided it is one in which the speed of the secondary clocks depends directly upon the speed of rotation of the generating apparatus at the central station. In case of synchronous motor-driven clocks, the rotating apparatus comprises a source of alternating current, the frequency of which is to be controlled.

The system as thus far outlined is broadly claimed in my application filed October 2, 1920, Serial No. 414,161, entitled "Control system" and assigned to the same assignee as the present invention.

It is the main object of my present invention to apply such automatic speed-regulating systems as outlined above to the regulation of prime movers. More specifically my present invention consists in applying such a speed-regulating system to existing types of prime mover governors. Other objects and advantages of my control system will become apparent as the description proceeds.

The construction and mode of operation of my invention will be understood from the following description taken in connection with the accompanying drawing, and its scope will be pointed out in the appended claims.

Referring now more in detail to the drawings, I have shown a system of distribution, the mains of which are indicated at 1, for supplying an ordinary commercial load 2, such as light and power, and for supplying secondary clocks indicated diagrammatically at 3 and which may be connected in multiple with other translating devices not shown. This system may be, for example, an alternating current system, either single or polyphase. The mains 1 are supplied with power in the present illustration from an alternating current generator 4. Any type of prime mover may be used to drive the alternator 4, the speed of which determines the frequency of the alternating current system, and thus the rate of the clocks. In the present case I have shown this prime mover to be a turbine 5 having a source of fluid supply conducted thereto through the pipe 6. The turbine is provided with the usual speed-governing device indicated in general at 7 which controls the throttle valve 8. The governor is driven from the turbine shaft in the usual manner by means of gearing 9. The setting of the governor is adapted to be manually adjusted by a spring 10. The adjustment of this spring may be effected by a small electric motor 11 controlled from a distant point as, for example, the switchboard of the power station, in a well known manner for the purpose of attaining distant speed control over turbines. Such means is indicated by the keys 12 and 13 which when closed on their corresponding contacts energize the motor 11 from a battery 14 to drive the motor in one direction or the other and correspondingly adjust the setting of the governor to raise or lower the turbine speed. The centrifugal element 15 of the governor actuates a lever 16, the outward radial movement of the centrifugal device tending to lower the left-hand end of the lever 16, as the speed of the turbine increases, to close the throttle valve 8, this tendency being opposed by the adjustable spring 10. Attached to the same lever 16 is a soft iron core 17 located in the axis of a solenoid 18. The core 17 is perfectly free to move within the solenoid and does not interfere in any way with the action of the governor so long as the solenoid is not energized and even when the solenoid is energized does not interfere with the free movement of the governor, but only serves to bias it.

Across one phase of the alternating current mains 1 is a transformer 19 which serves as a source of low-voltage current for the regulating circuit which extends between a master clock speed-regulating device, indicated in general at 20 and the solenoid 18. The regulating apparatus 20 is dependent for its action upon the comparison of the speed of generator 4 and a standard timepiece indicated at 21 which has been accurately adjusted. The speed of the turbo-driven alternator 4 is duplicated in the control apparatus 20 by means of a small synchronous motor 22 adapted to be supplied from the transformer 19 and here shown as a self-starting synchronous type, such as shown, for instance, in various Letters Patent granted to me Nos. 1,283,432, 1,283,433, 1,283,435 and 1,390,320, and assigned to the same assignee as the present application. The standard timepiece in this instance comprises a pendulum 23, escapement wheel 24 and pawl 25. In order to compare the speeds of the synchronous motor 22 and the standard timepiece, I make use of an endless flexible member such as a belt or chain 26, having a loop 27 therein and adapted to be driven at one point by means of synchronous-driven motor 22 and at another point is adapted to be advanced in accordance with the speed of the standard time piece. The particular transmission between the motor and the flexible member will be later described. By appropriate gearing the belt or chain 26, which is made of such flexible material as a steel strip or of links, and which is prevented from slipping over the driving pulleys 28 and 29 by means of pins 30 engaging the belt or chain, is allowed to be advanced by the standard timepiece at the same rate as it is being driven by the synchronous motor 22, when the speed of this motor is at the correct value. In this way the length of the loop 27 stays constant, provided the speed of the turbo-alternator 4 is at the proper value, and this length furthermore may be used as an indication of the accumulated excess in time of the secondary clocks over the indication of the standard timepiece or vice versa. Such indicating means is shown above the standard timepiece at 31. This indicating mechanism is described and claimed in my application filed July 21, 1920, Serial No. 397,920, entitled "Time indicating apparatus" and assigned to the same assignee as the present invention. I have not shown the indicating apparatus actuated by the standard timepiece, but it is evident that hands and a dial may be provided for this purpose. It is also evident that should the average frequency vary, the length of the loop 27 as measured from corresponding points at the driving pulleys 28 and 29 would vary from normal and this would show a non-coincidence of indications of the secondary clock and of the standard timepiece. It is furthermore evident that other means for duplicating the motion of the alternator 4 in the apparatus 20 may be utilized for moving the endless flexible member 26 instead of the synchronous motor 22, but the means I have shown is advantageous when it is desired to have the regulating apparatus at a considerable distance from the central station, since by this means actual mechanical connection between the alternator 4 or the turbine 5 and regulating apparatus 20 is obviated. The direction of rotation of the synchronous motor 22 and of the shaft driven or advanced by the standard timepiece are, in the given illustration, such that the loop lengthens when the synchronous motor 22 stops or rotates too slow. The proper direction of rotation of the driving pulleys 28 and 29 is shown by the arrows thereon. With this arrangement it is not essential to use a spring for keeping the pendulum going, since the requisite energy for doing this is obtained from motor 22 through the mechanical connection between the motor and the timepiece.

Located within the loop 27 is the sheave 32 which may act as a weight, or if this be insufficient an extra weight or movable member 33 may be added, suspended on the shaft of the sheave 32. This weight serves to keep the pendulum going even after an interruption in the service because it descends and gives up its potential energy to the pendulum through the intermediate mechanical connection. As shown in my prior patents referred to above, the motor 22 has an irreversible drive somewhere in its train of gears, such as a worm and wheel, whereby it is impossible for the movable member or link 26 to rotate the motor backwards when the motor stops. It is evident that the length of the loop 27 as well as the position of the movable member 33 is a function of the variation in time between the secondary clocks and the standard timepiece. I utilize this variation in length for performing the regulating functions. As above referred to, I may also in addition employ an indicator 31 for indicating the variation between the secondary clock and the standard timepiece. In this case its pointer is moved in response to variations in length of the loop 27 by means of a flexible connection or cord 34 joined at one end to the axle of the sheave 32 and at the other end to a drum 35 which carries the pointer of the indicator 31. In order to keep the flexible element taut at all times a spring takeup is utilized comprising a spur gear 36 loosely mounted on the stationary shaft 37, together with a spur gear 38 rigidly fastened to the drum 35 upon which the flexible member 34 is wound. Rigidly fastened at its inner end to the shaft 37 is a helical spring 39 of comparatively light construction. The outer end of this spring is fastened to the gear 36. It is evident that this helical spring 39 acts to stretch the member 34 at all times.

As has been stated heretofore, the variation in length of the loop 27 may be utilized in any well known manner for effecting the regulation of the speed of the turbine 5. In this instance the rise and fall of the movable member 33 is made use of to make and break electrical contacts. For this purpose I show a member 40 adapted to be tilted to perform this function. This member may be a mercury contact tube, and I show this member as a pivoted lever 40 simply for ease of illustration forming one contact and cooperating with the stationary contact 41. I have also shown another pivoted lever 42 which moves in unison with lever 40 cooperating with a stationary contact 43. These contacts regulate the current flowing through the solenoid 18. While the control circuit for the solenoid has been shown as connected to the secondary of the transformer 19, it is evident that the direct current from an exciter or from a battery might be used equally well or in certain cases to better advantage for this purpose. The lever 40 has one end in the path of the movement of the weight 33 which will rise and fall with errors in the average frequency of the alternating current motor circuit to close contacts 41 and 43 which control the circuit of the solenoid 18. It will be noticed that a resistance 44 is provided in series with contact 43. The arrangement of the arm 40 and 42 is such that contact 43 will be closed before contact 41. The exact relation between the time in which these two contacts will close due to the upward movement of the weight 33 may be adjusted by the screw 45. When contact 43 is made solenoid 18 is energized through the resistance 44 and when contact 41 is made solenoid 18 is energized directly from the secondary of transformer 19, the resistance 44 being short circuited. A stop 46 is provided to prevent the lever 40 from dropping out of the path of the weight 33, due to an interruption in the circuit such as would cause the weight 33 to be lowered a considerable extent.

The operation of the system as thus far described will now be explained. Assuming the turbo-alternator to be running at exactly correct speed and supplying energy to the system, with the conditions of the speed-regulating means 20 as shown in the drawing, under these conditions the motor 22 will run at the same speed as the master clock and there will be no change in the position of the weight 33. Now if the speed of the system increases slightly above normal, motor 22 will run faster than the master clock and shorten the loop 27. This will move lever 40 and cooperating lever 42 upward to close contact 43 energizing solenoid 18 through resistance 44 from the secondary of the transformer 19. The solenoid 18 will thereupon bias the governor lever 7 downward a slight extent effecting a slight closure of the throttle valve 8 and a corresponding slight decrease in the turbine speed. If this slight decrease in speed is just sufficient to bring the speed back to normal, the weight 33 will stop rising and keep the solenoid 18 partially energized through the contact 43. However, if the decrease in speed is such as to bring the turbine speed slightly below normal, the weight 33 will move downward allowing lever 42 to move away from contact 43 to deenergize the solenoid 18, allowing the valve 8 to open slightly to increase the speed. The speed control spring 10 should be so adjusted by the motor 11 that the definite slight increment and decrement of speed thus produced through the action of the master clock will have the effect of carrying the speed alternately to a slight extent above and below its true normal average value. For example, if the normal value of frequency is 60 cycles, it will be sufficient if the solenoid 18 can bias the governor to an extent so that it will run as high as 60½ cycles and as low as 59½ cycles. The operation as thus far described has not made use of contact 41 which permits the solenoid 18 to receive the full voltage of source 19. There may be conditions where it would be desirable to bias the governor to a greater extent or to utilize smaller increments and decrements than those given and for this purpose the additional contact 41 is provided. For example, if after the contact 43 is closed due to a slight increase in speed above normal, the speed is still too high, the weight 33 will continue to rise until contact 41 is closed, short circuiting the resistance 44 and strengthening the biasing effect of solenoid 18 upon the governor 7. Thus there are two steps in the process of regulating the speed which depend upon the magnitude of the error between the synchronous motor 22 and the master clock. It is evident that additional contact levers might be provided, each of which cuts out a portion of the resistance 44, to make as many steps in the regulation as desired. In the present illustration the synchronous motor 22 has been shown adapted to decrease the length of the loop 27 when its speed is greater than that of the master clock. It is evident, however, that I might arrange the driving connections between the master clock and the motor 22 so that an increase in the speed of the synchronous motor over that of the clock would lengthen the loop, for example by arranging the two pulleys 28 and 29 to be driven in the direction opposite to that illustrated. In this case the solenoid contacts 41 and 43 would be arranged below the levers 40 and 42 instead of above.

One of the advantages resulting from the use of my system is that the movable member or weight 33 may move downward upon a lengthy interruption in service without causing any damage or other abnormal conditions of the apparatus. Assume for example that there is an interruption of an appreciable length of time in the service or that there have been several such interruptions in a short period of time; the movable weight 33 is then entirely disengaged from the tiltable member 40 and the contacts between this member and contacts 41 and 43 are open. The effect of the interruption of the service is merely to allow the weight 33 to descend and it may keep on descending for an appreciable time as much as a few hours. Now, when the current is turned on again upon a resumption in the service, the conditions are such that the steam turbine 5 has a speed slightly higher than normal since the biasing effect of the solenoid 18 is absent. Consequently synchronous motor 22 will shorten the loop 37 until the tiltable member 40 again comes into operation to bias the governor 7 as previously described. In some cases where the interruption in service is for a considerable duration, it may be desirable to speed up the system to a greater extent than is possible with a normal setting of the governor 7 and thus correct the secondary clocks in a relatively shorter time. If this is desirable the governor setting may be changed by the motor 11 operating on the spring 10. As soon as the secondary clocks indicate correctly with reference to the master clock, the spring 10 may again be adjusted to its normal setting. It is therefore obvious that the time regulating system controlled by the master clock does not interfere in any way with the ordinary operation or adjustment of the governor, and that the turbine may be momentarily speeded up or slowed down in a manner often desirable for synchronizing purposes by means of the remote control motor 11 and the spring 10, after which the clock control system will automatically adjust for any error resulting to the secondary clock. If desirable I may disconnect the time controlling device from the system entirely by opening its controlling circuits, for example, by means of the switch 47.

It is of course obvious that the details of the regulating device 20 may be changed considerably without departing from the scope of my invention. For example, the current which energizes the solenoid 18 may be controlled by relay instead of directly by the differential clock contact. Instead of a solenoid, an electromagnet may be used to bias the governor 7 or any other device such, for instance, as a hydraulic or pneumatic piston which will exert a definite control force to bias the governor and in some instances the torque of a small motor might be advantageously used. It is also evident that any number of prime movers having the same kind of control apparatus, connected in multiple will be biased at the same time and to the same extent, so that the automatic speed control of a large power station can be very readily and safely accomplished in this manner.

From the foregoing description it will be evident that my time clock control system may be applied to practically any existing type of governor and will cause the same to respond to minute variations in speed which would not effect the ordinary speed governor. Although my invention is particularly advantageous on systems supplying secondary clocks, it is evident that it could to advantage be applied to regulate the speed of a prime mover irrespective of whether the system is one supplying secondary clocks or not. As a practical illustration, suppose, as is often the case, that it becomes desirable to connect one or more isolated existing generating stations into a single interconnected system. The existing governors of the various isolated prime movers are sufficiently accurate to serve their purpose when the stations are isolated but such governors are not in some cases sufficiently accurate when the stations are connected to a common system. Furthermore, the various governors often have different characteristics and degrees of accuracy and some respond more quickly than others to a speed change. To replace all of the unsuitable governors would be a costly proposition and would furthermore require the shutting down of the station during the change. My invention makes it possible to utilize an existing unsuitable governor by simply attaching a biasing means, controlled by a master clock regulator, such as described, to some part of the governing mechanism to give it just the desired degree of accuracy so that it will cooperate with the other governors on the system to keep the load carried by the prime mover which it governs within the desired proportion, and, furthermore, the change may be made without shutting down the station. Although I have described the apparatus as biasing the governor to a lower speed position, it might, in certain cases, be desirable to have the apparatus adjusted to bias the governor to a higher speed position, or I might arrange two such means for the same governor cooperating with two sets of contacts or equivalent devices in such a manner that one biases the governor to a lower speed position and the other biases the governor to a higher speed position, both being inactive or equally active when the speed is exactly correct.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a speed control system, rotating apparatus, an automatic governor adapted to keep the speed of said apparatus at a substantially constant normal value, means adapted to measure the average error in the speed of said apparatus, and means dependent on said average error measurement for producing a biasing force upon said governor.

2. In combination an alternating current generator, a prime mover for driving said generator, an automatic governor for said prime mover adapted to keep the frequency of said generator at a substantially constant normal value, a differential master clock mechanism for measuring the average error in said frequency, and means dependent upon said measurement for biasing said governor in a manner to correct said error.

3. In a speed control system for rotating apparatus, an automatic governor for keeping the speed of the rotating apparatus at a substantially constant value, an accurately adjusted timepiece, an endless flexible member, means for driving said member in synchronism with the rotating apparatus, means for causing said member to be advanced at another place in synchronism with the movement of said timepiece, whereby the length of the member included between the places where it is being advanced by said two latter means is a function of the variation in speed of the rotating apparatus, and means for biasing said governor in a manner to correct for said variations in speed, said means being actuated in response to the variations in said length.

4. In combination a prime mover, an automatic governor therefor adapted to keep the speed of said prime mover at a substantially constant normal value, a differential clock mechanism for continuously measuring the average deviation of said speed from its normal value, and means controlled by said mechanism, and exerting a force proportional to the magnitude of said deviation at any instant, for biasing said governor in a manner to reduce said deviation.

5. In combination a prime mover, an automatic governor for maintaining the speed of said prime mover at a substantially constant normal value, a differential master clock mechanism adapted to measure the accumulated error in the speed of said prime mover, means actuated by said mechanism for biasing said governor in a manner to correct for small variations from normal speed when said accumulated error is small, and means for adjusting the speed setting of said governor whereby a large accumulated error in said speed may be quickly corrected.

6. In combination a prime mover, a governor therefor adapted to keep the speed of said prime mover at a substantially constant normal value, a differential master clock mechanism for measuring the average error in said speed, means controlled by said mechanism adapted to bias said governor to a position to correct for said error, the biasing force being proportional to said error and responsive to speed variations which are too small to effect the normal operation of said governor.

7. A prime mover provided with a speed governor, means for increasing the accuracy of said governor comprising a differential master clock mechanism associated with said prime mover in such a way as to detect variations in the speed of said prime mover which are too small to effect the normal operation of said governor, and means responsive to said variations for producing a biasing force on said governor in the proper direction to correct said speed, said force being progressively increased until the speed has been brought back to its correct value.

In witness whereof, I have hereunto set my hand this 5th day of December, 1921.

HENRY E. WARREN.